(12) United States Patent
Mazzotti

(10) Patent No.: US 11,311,149 B2
(45) Date of Patent: Apr. 26, 2022

(54) AUTONOMOUS HAND-WASHING STATION FOR SHOP FLOOR

(71) Applicant: Ermanno Mazzotti, Bella Vista, AR (US)

(72) Inventor: Ermanno Mazzotti, Bella Vista, AR (US)

( * ) Notice: Subject to any disclaimer, the term of this patent is extended or adjusted under 35 U.S.C. 154(b) by 155 days.

(21) Appl. No.: 15/931,173

(22) Filed: May 13, 2020

(65) Prior Publication Data
US 2021/0353108 A1  Nov. 18, 2021

(51) Int. Cl.
*A47K 1/00* (2006.01)
*A47K 1/02* (2006.01)
*G05D 1/00* (2006.01)

(52) U.S. Cl.
CPC .............. *A47K 1/02* (2013.01); *G05D 1/0088* (2013.01)

(58) Field of Classification Search
CPC ................................. G05D 1/0088; A47K 1/02
USPC ............................................ 4/625, 516, 654
See application file for complete search history.

(56) References Cited

U.S. PATENT DOCUMENTS

| | | | | |
|---|---|---|---|---|
| 3,709,198 A | * | 1/1973 | Williams | F24H 1/06 122/17.1 |
| 3,983,583 A | * | 10/1976 | Herman | A47B 69/00 62/331 |
| 4,072,157 A | * | 2/1978 | Wines, Jr. | A47K 1/02 134/107 |
| 4,942,631 A | * | 7/1990 | Rosa | E03C 1/057 4/623 |
| 5,251,345 A | * | 10/1993 | Pechner | A47K 3/325 4/603 |
| 5,257,423 A | * | 11/1993 | Jacobsen | E03B 9/20 312/228 |
| 5,465,438 A | * | 11/1995 | Allman | A47K 1/02 4/516 |
| 6,173,458 B1 | * | 1/2001 | Maddux | A47K 1/02 4/619 |
| 6,253,394 B1 | * | 7/2001 | Goyette | A47K 1/02 4/626 |
| 6,711,757 B2 | * | 3/2004 | Peck | A47K 1/02 4/516 |
| 7,441,286 B1 | * | 10/2008 | Taylor Parker | A47K 1/02 280/652 |
| 7,506,386 B1 | * | 3/2009 | Adrian | F24H 1/08 122/14.2 |
| 8,082,611 B1 | * | 12/2011 | Marshall | A47K 1/02 4/625 |
| 8,602,353 B2 | * | 12/2013 | Lindauer | B64D 11/02 244/118.5 |
| 9,883,774 B2 | * | 2/2018 | Wade | A47L 13/10 |
| 10,271,691 B1 | * | 4/2019 | Boyle | A47K 1/05 |

(Continued)

OTHER PUBLICATIONS

Qualserve Corporation, WMSC24MS Service &Operation Manual, Apr. 16, 2010.

(Continued)

*Primary Examiner* — Hung Q Nguyen
*Assistant Examiner* — Anthony Donald Taylor, Jr.
(74) *Attorney, Agent, or Firm* — Michael P. Mazza; Michael P. Mazza, LLC

(57) ABSTRACT

A portable, autonomous hand-washing station for use on a store floor. The portable station includes a cabinet supporting a sink and faucet, and housing one or more liquid storage tanks; and a removable control box.

13 Claims, 11 Drawing Sheets

(56) References Cited

U.S. PATENT DOCUMENTS

| | | | |
|---|---|---|---|
| 2003/0019031 A1* | 1/2003 | Mosis | E03C 1/18 |
| | | | 4/625 |
| 2003/0097710 A1* | 5/2003 | Adrian | F24H 1/06 |
| | | | 4/598 |
| 2004/0083546 A1* | 5/2004 | Tahara | A47K 1/04 |
| | | | 4/619 |
| 2005/0284889 A1 | 12/2005 | DuBois | |
| 2011/0008221 A1* | 1/2011 | Vitali | A61B 50/13 |
| | | | 422/300 |
| 2015/0000030 A1 | 1/2015 | Stine | |
| 2015/0216369 A1* | 8/2015 | Hamilton | A47K 5/1217 |
| | | | 222/1 |
| 2018/0140142 A1 | 5/2018 | Aich | |

OTHER PUBLICATIONS

PCT International Search Report and Written Opinion, dated Jun. 25, 2021.

* cited by examiner

AUTONOMOUS HAND-WASHING STATION FOR SHOP FLOOR

BACKGROUND OF THE INVENTION

The present invention generally relates to free-standing, hand-washing equipment, such as those used in grocery and other food merchandise stores.

Various hand-washing stations are known. However, a consistent problem in the food retail business where food is offered for tasting on the store floor, is the lack of a portable hand-washing station which is self-powered and independent from external power supply sources, which has an autonomous water supply, and which complies with applicable health and sanitation standards. (Shop floor food tasting stations are often located in areas of heavy customer traffic, where a food demonstration is being performed, and where water lines and/or electrical connections may not be readily available; however, the ability to hand-wash in this environment is often mandatory (as well as advisable), given health inspector requirements.) Currently available hand-washing stations are dependent on standard electrical outlets and/or rely on municipality-provided sources of water.

Accordingly, it would be advantageous to provide a free-standing hand-washing station that: provides autonomous sources of power and water; complies with applicable health and sanitation standards; conserves water and energy; and is portable, and can be moved to environments and locales where water and electricity is not readily available. Use of such a station is particularly advantageous during times of pandemic such as the coronavirus.

SUMMARY OF THE INVENTION

The objects mentioned above, as well as other objects, are solved by the present invention, which overcomes disadvantages of prior hand-washing stations, while providing new advantages not previously associated with such stations.

Accordingly, a primary object of the present invention is to provide a portable, autonomous hand-washing station for use on a store floor. In a preferred embodiment, the hand-washing station may include: a cabinet supporting a sink and faucet, and housing one or more liquid storage tanks (which may contain sources of fresh and grey water); a source of power; and a removable control box. For example, the control box may contain one or more batteries, a pump, a filter, and a liquid heater. Preferably, the control box is easily removable from the hand-washing station without the use of tools.

The station may be mounted on caster wheels, for example, and may also include one or more standard electrical outlets. The faucet may have a motion detector that is sensor-activated, to automatically control the time of flow of a liquid, such as water, from the faucet. The water or other liquid dispensed from a storage tank may be heated by an on-board heater, to within a desired temperature range prior to dispensing.

In a preferred embodiment, the control box carries tubing connections for attaching tubing carrying liquid between the faucet and the storage tanks, and after uncoupling of tubing from the storage tanks, a worn control box may be removed from the cabinet, and a new, replacement control box may be attached to the cabinet and its tubing connections re-attached.

Additionally, the one or more batteries may be recharged using a battery recharger located on the station.

DEFINITION OF CLAIM TERMS

The terms used in the claims are intended to have their broadest meaning consistent with the requirements of law. Where alternative meanings are possible, the broadest meaning is intended. All words used in the claims are intended to be used in the normal, customary usage of grammar and the English language.

"Autonomous" means that water and power may be supplied on-board the portable station, and not externally of the station.

"Free-standing" means that the hand-washing station of the present invention is not supported by an external support, but only on its wheels, casters or other portable support means.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
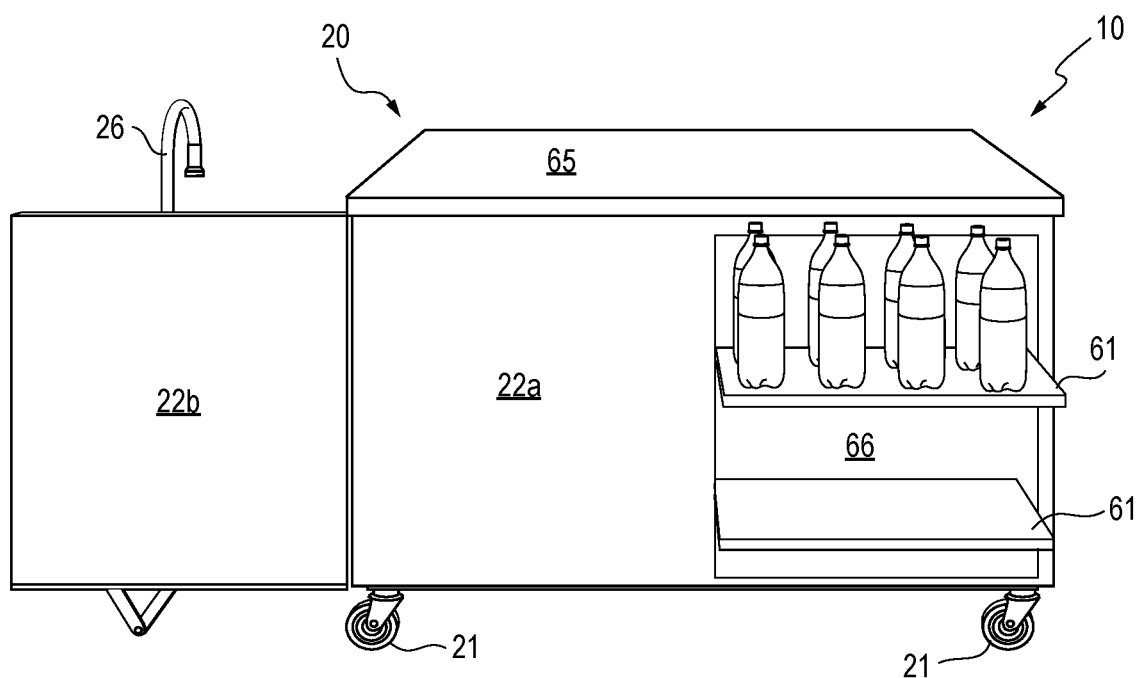
FIG. 1 is a front perspective view of one preferred embodiment of the hand-washing station of the present invention.
Figure 2:
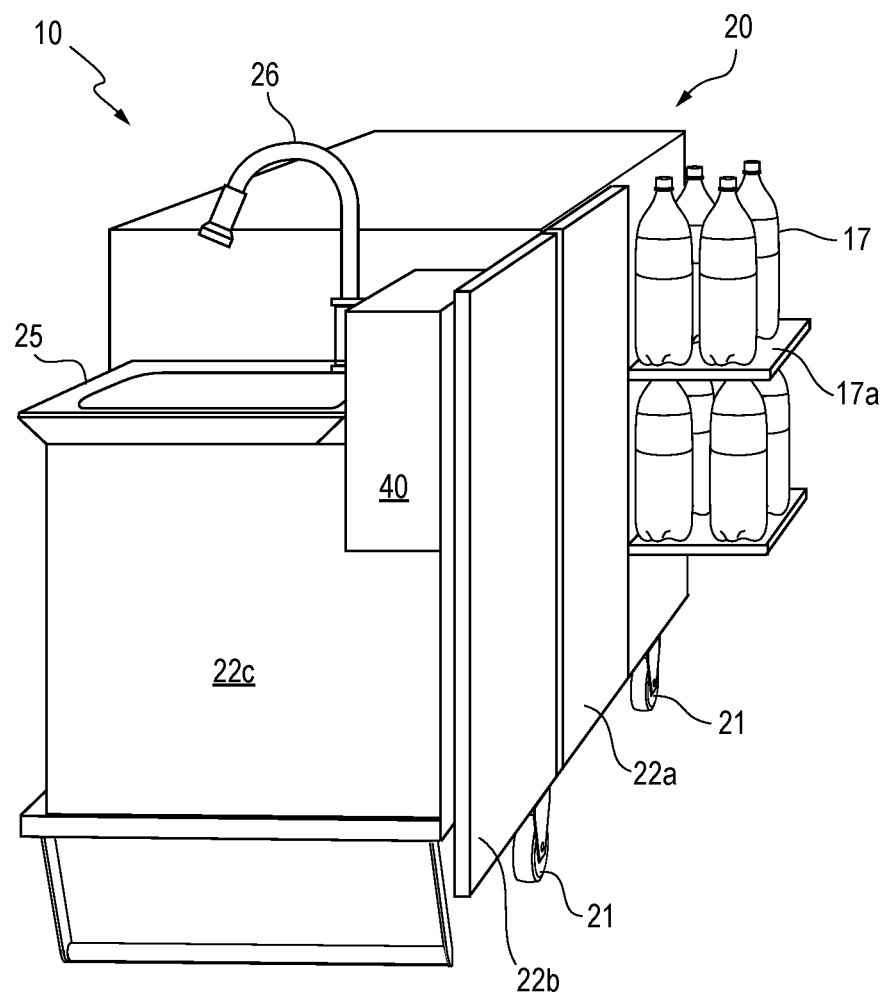
FIG. 2 is a left-side perspective view of FIG. 1.

Referring first to FIGS. 1-2, in a preferred embodiment, portable hand-washing station 10 is shown, and has two main components: a cabinet 20, and a control box 40. Cabinet 20 may be mounted on pivoting, locking heavy-duty caster wheels 21, and may need to be autonomous (i.e., carry its own power and water supply), as it may be located at a point of use which is remote from external power and water supplies.

Cabinet 20 may include a cabinet front door 22a providing access to the interior of the cabinet, which may contain tanks 23, 24 with fresh and "gray" water, respectively. ("Gray" water is water that has been used, such as to wash the hands of a station user.) For example, fresh water tank 23 may have a 5-gallon capacity, while gray water tank 24 may have a 6-gallon capacity. The portability of station 10 facilitates the filling and draining of tanks 23, 24 at a remote filling station, for example.

An adjacent, attached cabinet with a front wall 22b and side wall 22c may carry a sink/bowl 25 with a faucet 26, and a control box 40. Sink 25 may be made of stainless steel and in compliance with applicable CSA-UL-NSF standards. Cabinet doors may include hidden security locks. A paper towel holder (not shown) may be mounted on cabinet 20, while shelving 17a may accommodate liquid containers 17 (e.g., water bottles) for drinking.

Faucet 26 may be a gooseneck-type, swivel motion, sensor-activated faucet with handle 26a. (If hot and cold water is supplied, then controls for providing hot and cold water may be utilized.)

Figure 5:
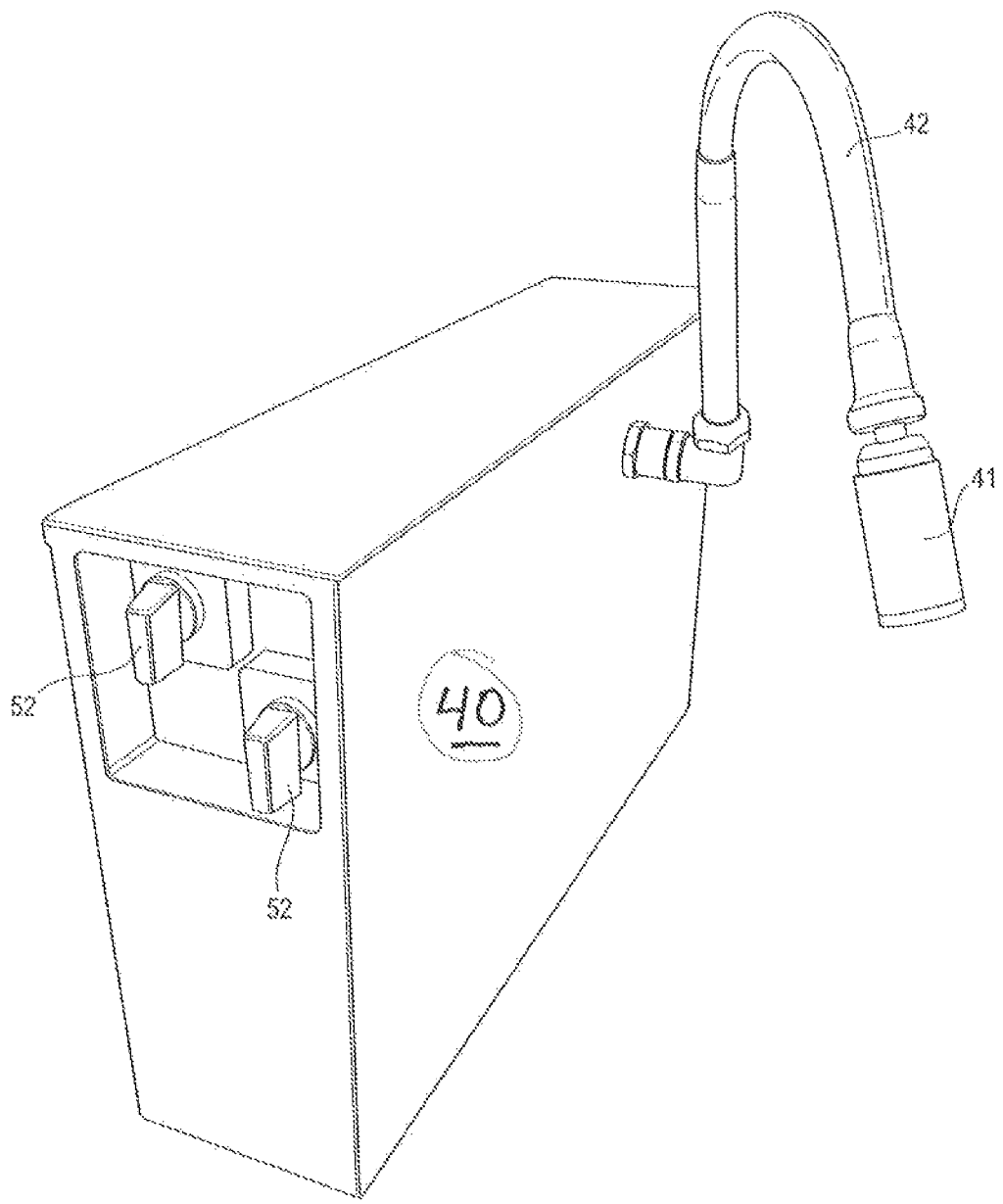
FIG. 5 is a perspective view of the control box shown in FIG. 2.
Figure 10:
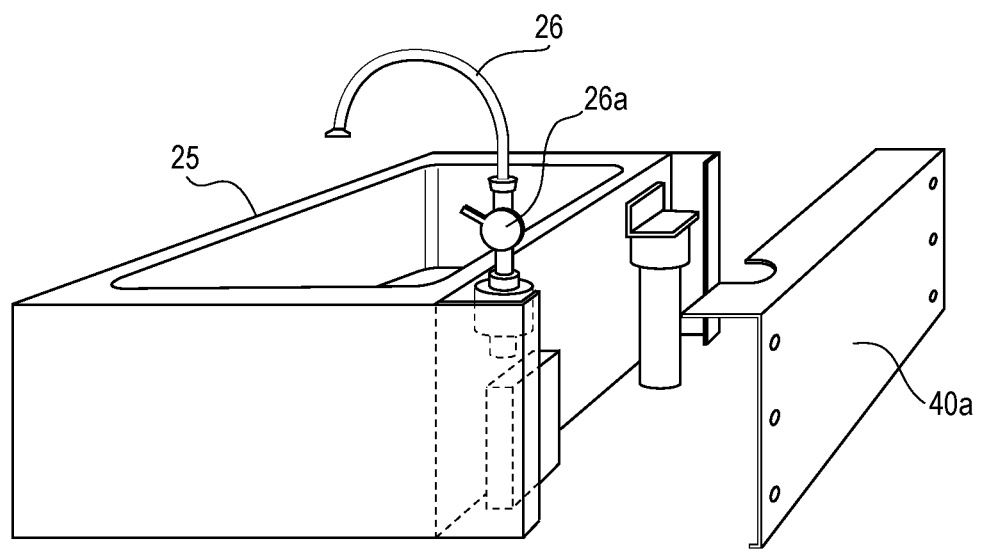
FIG. 10 is a left-side, partial perspective view of the sink with the control box removed, showing the control box cover.

Control box 40, including back base 40a (FIG. 10), is preferably made of stainless steel, and designed to accommodate all electrical and fluid controls, and to be secured at the sink bowl side. Thus, now referring to the electromechanical version shown in FIG. 6, control box 40 may house: submergible, self-priming water pump 41 (e.g., 12-volt, ¼ liter/minute flow); water filter 103 (e.g., 2000-gallon capacity); water line(s) 42; valve 43 (e.g., a solenoid valve); water heater with thermostat 44; a 110V-120V, 24V transformer 46; a 12-volt or 24-volt DC battery 48; a 24-volt DC power (110-volt/60 Hz AC power) automatic battery charger 49; a boiler 51 with heating element 51a and electrode 51b; electromechanical operator switches 52; a box 53 containing adjustable temperature and flow timing controls; and a 110-volt and/or 220-volt power cord 102 (FIGS. 6-7) and electrical outlets (not shown). Faucet 26 may also be mounted to control box 40 as shown, alternatively, at FIGS. 5 and 10.

Figure 9:
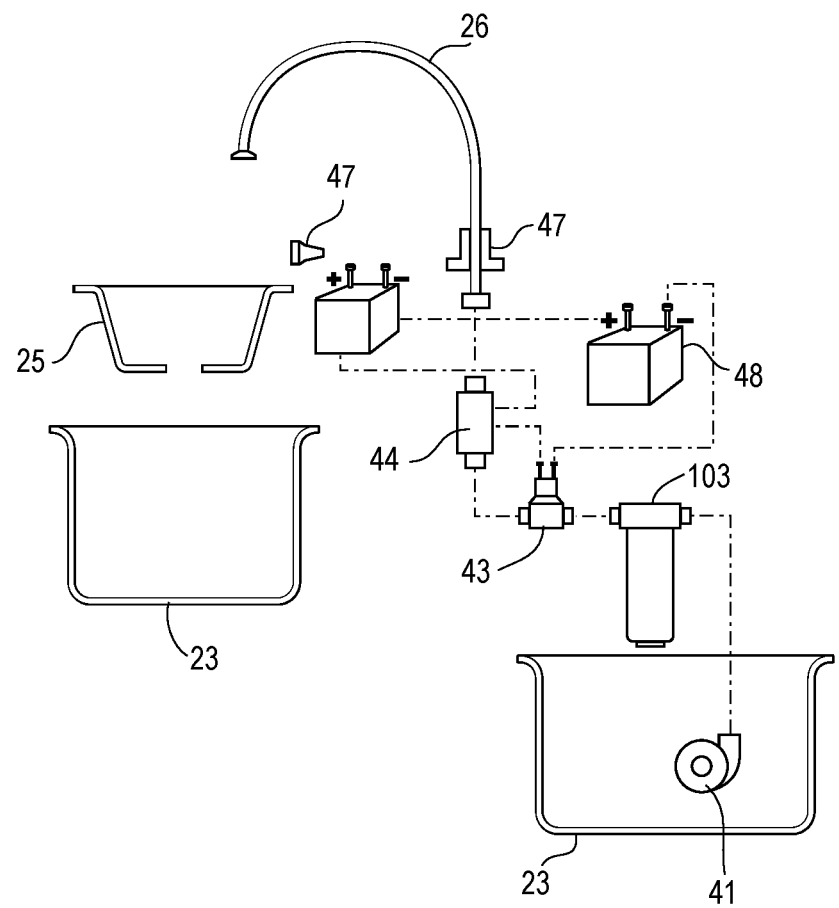
FIG. 9 is a schematic view of the water components.

These controls allow water to be pumped to faucet 26 from fresh water tank 23, at the desired temperature, and used "grey" water to be returned to tank 24. Water activation may occur upon a signal from proximity switch 47 located next to pivoting faucet 26 (FIG. 9), which senses the presence of hands near the faucet (works on single impulse each time). The length of time of water flow may be controlled using a timer (not shown) which activates (ON/OFF) submerged pump 41.

Water temperature may be controlled by a thermostatic electrical system. A temperature value may be shown on an illuminated panel display (not shown) (e.g., a 3-digit number selectable in either Centigrade or Fahrenheit, which may be set (e.g.) from 15-45° C. (60-110° F.)). To change the water temperature, a "Set" button (not shown, which then flashes) may be depressed, and then "+" or "−" buttons (also not shown) may be depressed, followed by again depressing "Set" to confirm the temperature. (A water temperature switch selector (e.g., a "smart switch") (not shown), enabling the selection of four difference water temperatures which are pre-set (e.g., from room temperature to 104° F.), may be employed. Having a "smart switch" is advantageous; as one example, when chlorine disinfection in the water is required, the water needs to be maintained at room temperature to avoid reducing the effectiveness of the chlorine.) In a similar fashion, the length of water flow time (cycle starts by proximity switch activation) can be changed (factory preset can be 7 seconds), using (e.g.) push buttons S1-S2-S3 displayed on the control panel (not shown).

Preferably, all controls are energized by a selected energy source, such as a portable, chargeable, permanently-mounted 12-volt and/or 24-volt lithium-ion battery 48 (preferably with an automatic, plug-in shut-off protector, which will cease charging when the battery is fully charged). Alternatively, 110-volt/220-volt electrical outlets (which may be used to charge the 24-volt battery), may also be used.

Figure 3:
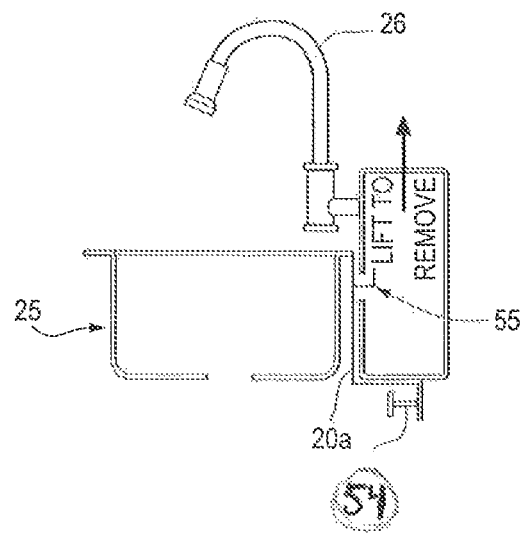
FIG. 3 is a partial left perspective view of the sink and control box of FIG. 1.
Figure 4:
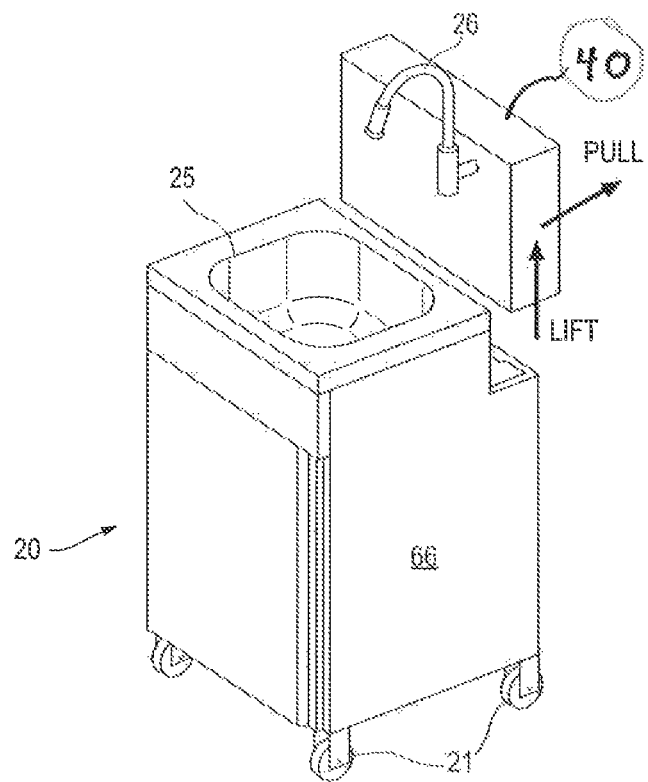
FIG. 4 is a partial side and top perspective view of the left-side of the cabinet of FIG. 1.

Referring to FIGS. 3-4, if any components are damaged or exhausted and need to be replaced, control box 40 may be easily removed, as now discussed, without the need for any tools, and without the need to move or reposition station 10. In an exemplary removal process, water lines 42 may first be uncoupled from the storage tanks 23, 24, allowing the tanks to be removed from cabinet 20 and refilled/emptied, as desired. Next, knob(s) 54 securing control box 40 to cabinet wall 20a (FIG. 3) may be unscrewed, allowing control box to be first lifted and disengaged from hooks 55, and then pulled from cabinet 20 and removed, as shown by the direction of the arrows in FIGS. 3 and 4. (Preferably, the water pump and associated tubing is still attached within the control box.)

After removal of the worn control box, a new control box, with new pump and tubing for example, may now be installed using the following exemplary procedure. First, the new water lines 42 are placed into the cabinet and attached. Next, new control box 40 is located on hooks 55 (one hook located at each end of the control box), and re-installed into position. Now, knobs 54 (one knob located at each end of the control box) may be tightened, securing the control box to the cabinet. Tank 23 is filled with fresh water, the water pump is dropped in and installed, and tubing 42 connects tank 24 with the gray water. On the box panel (FIG. 5), power control knobs 52 may be turned to select battery or 110-volt/220-volt power. (Note that when resuming water flow after filling tank 23, activating sensor switch 47 two or three consecutive times allows water line 42 to fill the tank.)

Figure 8:
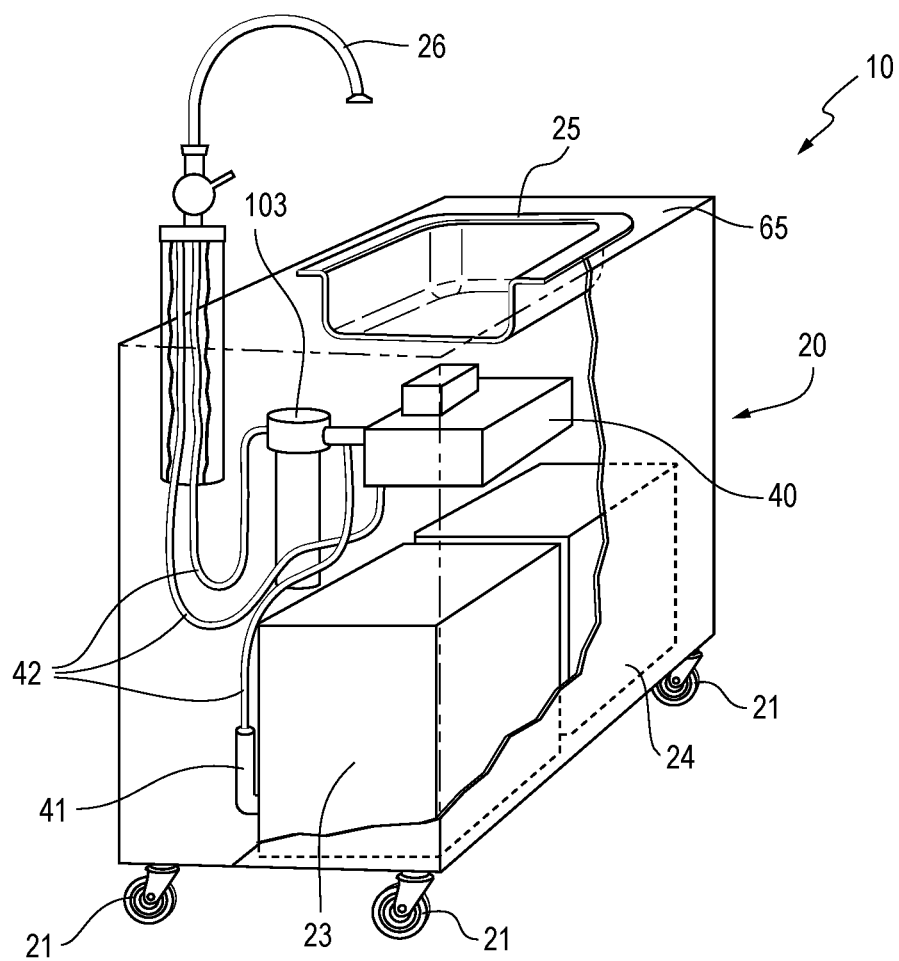
FIG. 8 is a left-side perspective view, in cut-away, of an alternative embodiment of a hand-washing station of the present invention.
Figure 12A:
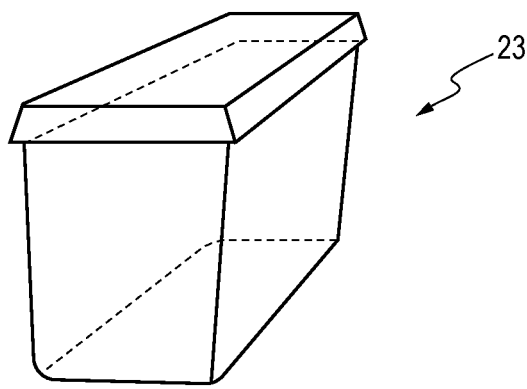
FIG. 12A is a perspective view of water storage tank 23.
Figure 12B:
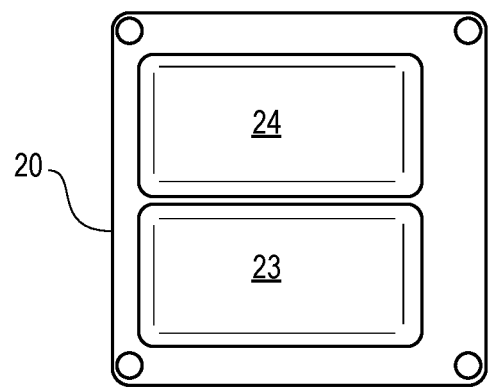
FIGS. 12B and 12C are bottom and side perspective views, respectively, of the station shown in FIG. 8.
Figure 12C:
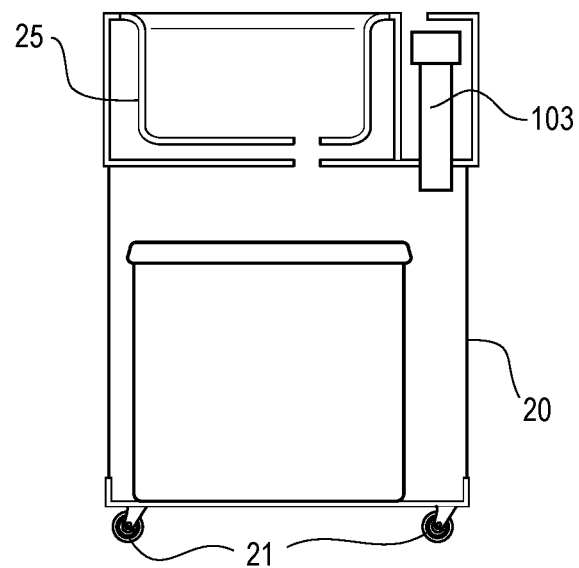

In a particularly preferred embodiment, portable hand-washing station 10 may consist of a sturdy, stainless steel, self-contained demonstration cart, as shown in FIGS. 8 and 12. Cart 10 again preferably moves on extra-strength casters 26 with locks. The cart may be equipped to carry 4-gallon water containers (2 polypropylene, FDA-approved) which slide out of the cart when in use. Cart 10 can be operated using a rechargeable battery independent from any standard electrical power supply.

Station 10 may vary in size, as desired. With regard to station 10 shown in FIG. 1, exemplary dimensions for countertop 65 (FIG. 1) may be 53"×30"×37" high. The preferably-stainless steel compartments 66 beneath countertop 65 may each have dimensions 22"×22"×28" high, to accommodate a (e.g.) 2-cubic-foot refrigerator (not shown). Corner frames 67 preferably have clear acrylic protection panels allowed to slide between and hold in place advertising signs 58. A corner-extendable post (not shown) may include an LED-illuminated panel (not shown) for personalized advertising visible from a distance. Table counter 65 may include a standard electrical plug (not shown) for powering any appliance on the table counter. The cart front may also include retractable shelves 61 which may fold flat when not in use, and can slide into the frame of the advertising panels. Grab handles (not shown) on opposing sides of cart 10 facilitate its mobility on the shop floor.

Referring to FIG. 8, cart 10 may include a preferably-stainless steel cabinet 20 with these exemplary dimensions: 22"×22"×40" (high). Exemplary sink bowl dimensions may be: 16" L×14"W×7"D. Again, cart cabinet 20 preferably houses water tanks 23, 24.

Cart 10 may be powered by a standard 110-volt/60 Hz (AC) electrical power, or by a 12-volt or 24-volt (DC) rechargeable battery, for continuous operation. A lithium-ion 24-volt DC battery is preferably used. Preferably, a high performance, self-charging CSA/UL-approved automatic shut-off protector (not shown) is connected to the battery. Optionally, cart 10 may also include a W.Q.A. certified water quality purification system.

Figure 6:
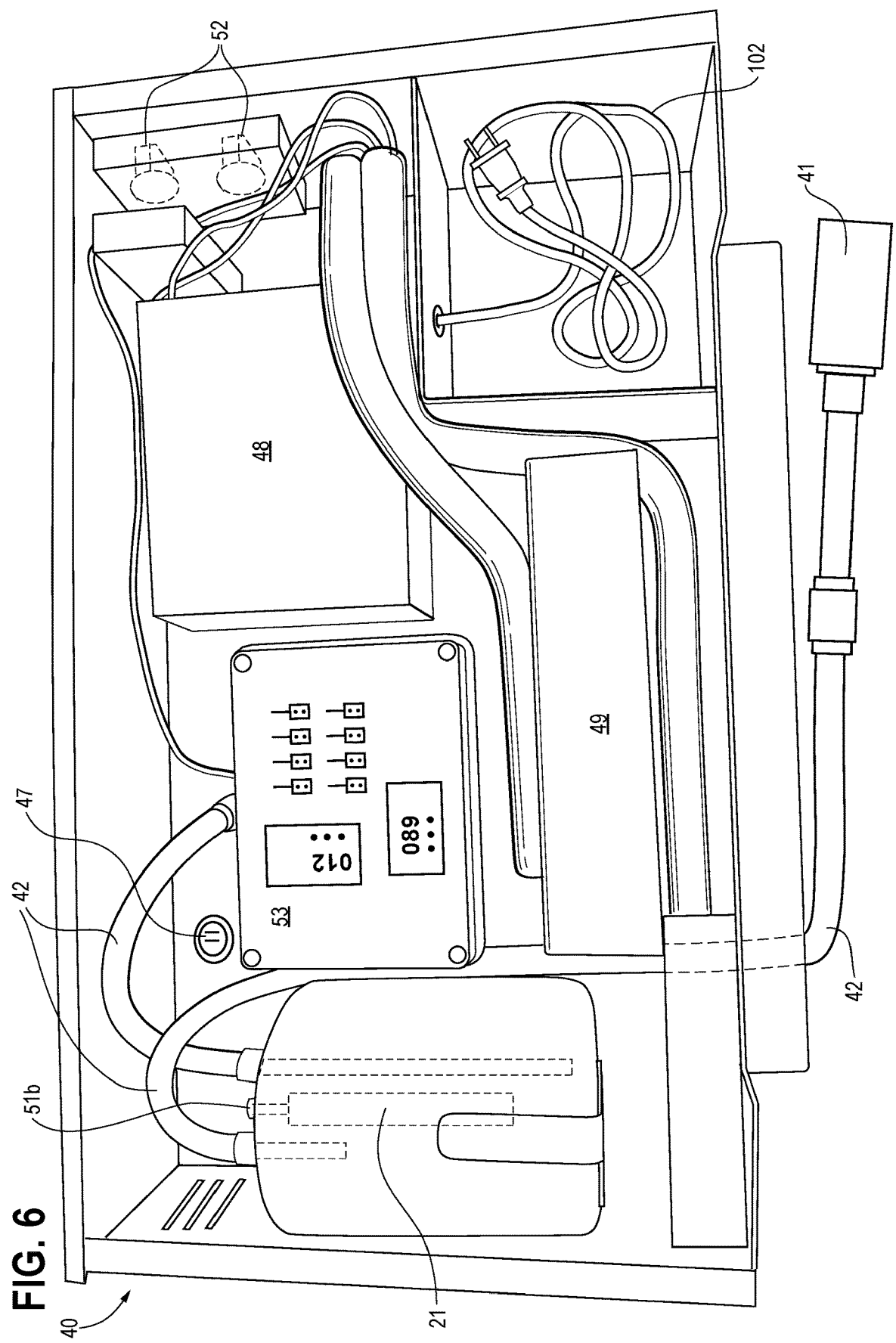
FIG. 6 is an interior, schematic view of the components within one preferred embodiment of the control box.

Referring to FIG. 6, one preferred version of control box 40 may include switches and cable-connected components, for more user-friendly usage, such as by elderly operators.

Figure 7:
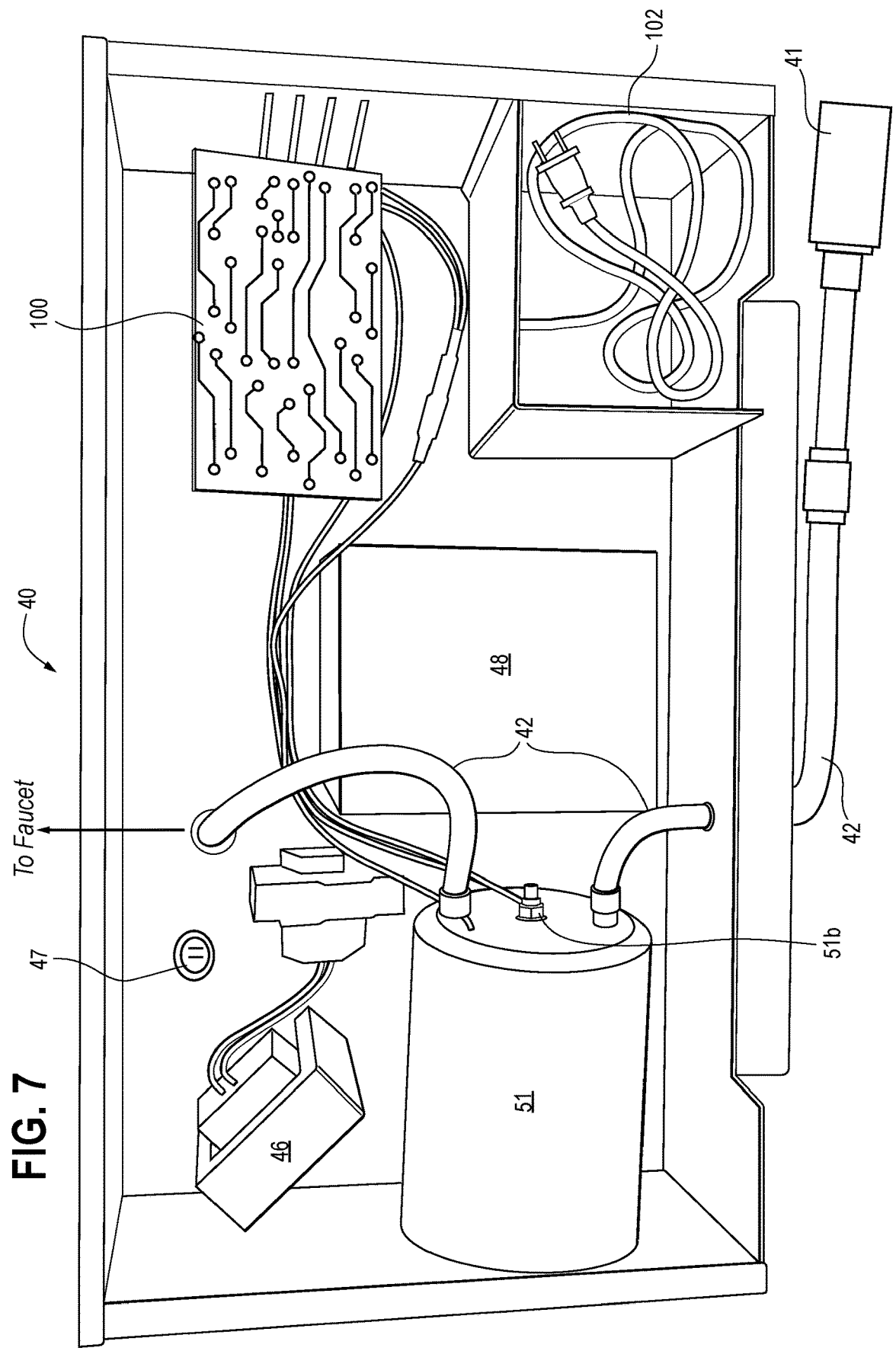
FIG. 7 is an interior, schematic view of the components within a second preferred embodiment of the control box.

Referring to FIG. 7, a second preferred version of control box 40 may be used, instead of the electromechanical version, for more functionally-demanding customers, and may include the following components: boiler (e.g., ¼ gallon capacity) 51; 110V/220V, 24V transformer 46; motion sensor 47a (e.g., Model E3FA-DP15 from Omron, photoelectric, diffuse reflective); battery 48 (e.g., Li-ion, 24 V, 15 amp, Model TLH-EV012; and electronic circuit board 100 (all controls incorporated into this board, including timer, temperature, etc., and adjustments to same); and a touch-button-illuminated screen (not shown).

Figure 11A:
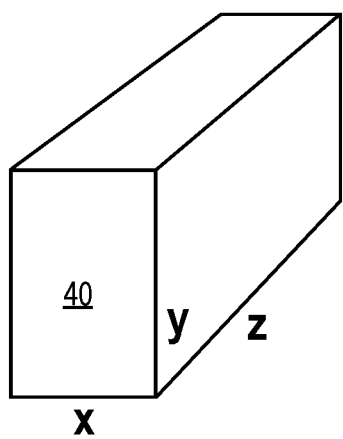
FIG. 11A is a schematic view of a control box.
Figure 11B:
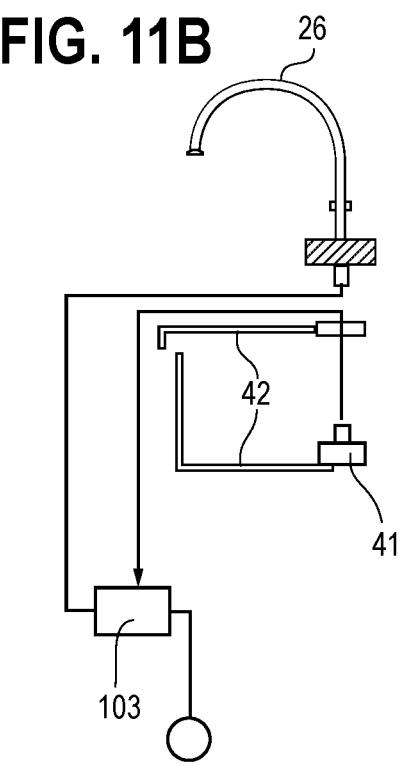
FIG. 11B is a schematic view of the water flow within a preferred station system.
Figure 11C:
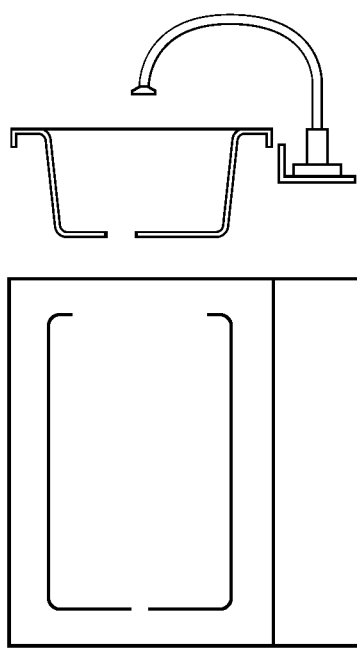
FIG. 11C is a left-side schematic view of the sink/faucet above the cabinet.

Referring to FIG. 11A, control box 40 may have approximate dimensions X/width of 7.9", Y/height of 11.8" and Z/depth of 14". Referring to FIG. 11B, hoses 42 are attached to control box 40 (not shown) and are in liquid communication with pump 41. Referring to FIG. 11C, sink 25 may be dropped in to fit cabinet 20.

Persons of ordinary skill in the art will now understand that the following advantages flow from the use of the present invention. Water is saved, as with the sensor-activated faucet there is extremely limited waste of fresh water, and the only water waste if from washing hands. Energy is also saved, as a limited amount of electricity is used only for the water that is actually used, while unused water is not warmed. The pump system is designed to work only when water is being used. The unit is compact for shipping and storage, and low-weight (e.g., about 90 pounds).

Further, the harmonized dimensions of station 10 allow its construction with very little waste, little welding energy, and little manufacturing waste or pollution. Preferably, all components and materials used in the manufacturing of this product are recycled at the end of the station's equipment life.

The preferred station 10 of the present invention is already used in about 1,000 Walmarts and about 100 Costcos within the United States, demonstrating its utility, advantages and commercial success. The threat of the coronavirus will likely increase its desirable use in a plurality of applications.

The above description is not intended to limit the meaning of the words used in the following claims that define the invention. Persons of ordinary skill in the art will understand that the examples disclosed here, as well as a variety of other examples and designs still falling within the scope of the following claims, may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

What is claimed is:

1. A portable, autonomous hand-washing station, comprising:
    a cabinet supporting a sink and a faucet, wherein the cabinet includes a detachable control box, and houses one or more liquid storage tanks in fluid communication with the faucet;
    wherein the control box includes a source of power, a liquid heater, and a water pump with associated tubing;
    wherein the control box is, without requiring tools, readily, manually detachable from the cabinet by loosening one or more tightening mechanisms that allow the control box to be rigidly connected to the cabinet, and then pulling up on the control box to detach the control box from the cabinet;
    wherein the control box, without requiring tools, may be readily replaced with a new control box such that the new control box is connected to the cabinet by dropping in the new control box so that the new control box is adjacent a rear portion of the cabinet, and then by tightening the one or more tightening mechanisms so that the new control box is rigidly connected to the cabinet; and
    wherein the station is wheeled and transportable, and may be moved and then rigidly stationed in position.

2. The portable, autonomous hand-washing station of claim 1, wherein the faucet is attached to the control box, and the control box contains one or more batteries, and a filter.

3. The portable, autonomous hand-washing station of claim 1, wherein the one or more liquid storage tanks comprise a storage tank comprising fresh water, and a storage tank comprising grey water.

4. The portable, autonomous hand-washing station of claim 1, wherein the control box includes one or more electrical outlets.

5. The portable, autonomous hand-washing station of claim 2, wherein the control box includes a motion detector located adjacent the faucet to automatically control a flow of liquid from the faucet.

6. The portable, autonomous hand-washing station of claim 3, wherein the fresh water is heated by the liquid heater to within a desired temperature range prior to dispensing.

7. The portable, autonomous hand-washing station of claim 1, wherein the control box carries tubing connections for attaching tubing configured to communicate liquid between the faucet and the one or more liquid storage tanks.

8. The portable, autonomous hand-washing station of claim 3, wherein a temperature of the liquid dispensed from the storage tank comprising fresh water may be automatically controlled, within a desired temperature range, by electronic temperature controls located on the control box.

9. The portable, autonomous hand-washing station of claim 1, wherein a length of time that liquid is dispensed from the faucet may be automatically controlled using electronic controls located on the control box.

10. The portable, autonomous hand-washing station of claim 2, wherein the one or more batteries may be recharged using a battery recharger located on the station.

11. The portable, autonomous hand-washing station of claim 1, wherein the station is mounted on caster wheels.

12. The portable, autonomous hand-washing station of claim 1, wherein the control box may be used to select between battery and AC power from an external power source.

13. The portable, autonomous hand-washing station of claim 1, wherein the tubing associated with the water pump is replaced when the control box is replaced with the new control box.

\* \* \* \* \*